No. 704,200. Patented July 8, 1902.
A. LENNOX.
SEWING MACHINE GUIDE.
(Application filed Apr. 2, 1901.)
(No Model.)

Witnesses:
J. B. McGivr.
C. M. Sweeney.

Inventor:
Alexander Lennox,
by Henry Calver,
Atty.

UNITED STATES PATENT OFFICE.

ALEXANDER LENNOX, OF HARRISON, NEW JERSEY, ASSIGNOR TO THE SINGER MANUFACTURING COMPANY, A CORPORATION OF NEW JERSEY.

SEWING-MACHINE GUIDE.

SPECIFICATION forming part of Letters Patent No. 704,200, dated July 8, 1902.

Application filed April 2, 1901. Serial No. 54,066. (No model.)

*To all whom it may concern:*

Be it known that I, ALEXANDER LENNOX, a citizen of the United States, residing at Harrison, in the county of Hudson and State of New Jersey, have invented certain new and useful Improvements in Sewing-Machine Guides, of which the following is a specification, reference being had therein to the accompanying drawings.

This invention has for its object to provide a sewing-machine guide or gage which is so mounted as to be mainly or wholly clear of the work-plate of the machine, so that in making seams around the inner sides of deep indentations or recesses between projecting portions of the work, as is required in stitching the uppers of leather slippers and other articles, the work may be freely turned about on the work-plate beneath the guide or gage.

In the preferred form of the invention the guide or gage is supported from the depending portion of the head of the machine and is so mounted as to be wholly clear of the throat-plate or work-plate, so as to allow one of two thicknesses of material being stitched together to pass freely beneath the guiding or acting portion of the gage and which guiding or acting portion directs the other thickness or ply of material, the edge of which is pressed against the gage, to the needle. The gage is in this preferred form of the invention formed on a pivoted bar yieldingly held in position against a suitable stop by a spring, so that the gage is free to rise and fall to accommodate itself to different thicknesses of material passing beneath it, and the pivoted bar referred to is preferably supported by a sliding bar adapted to move up and down, said sliding bar being held in working position by a spring-pressed catch or latch against the stress of a spring, which when said catch or latch is released will lift said sliding bar and the guide or gage supported thereby, so that the said guide or gage will be entirely out of the way when not desired for use.

Figure 1:
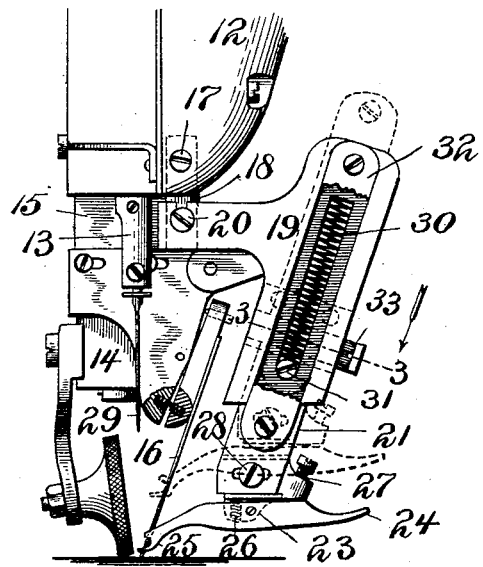
Figure 2:
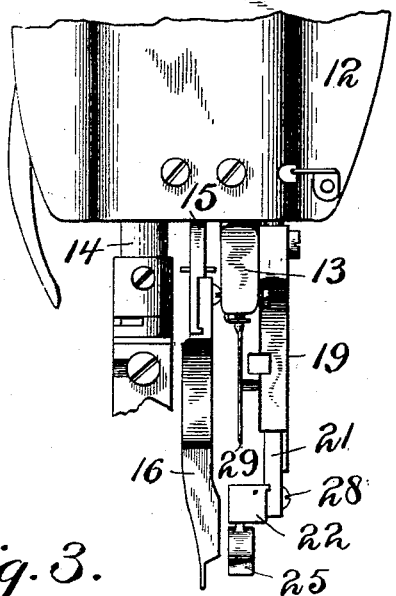
Figure 3:

In the accompanying drawings, Figure 1 is a front side view of a portion of a sewing-machine with the invention applied thereto. Fig. 2 is a front end view of the same with the roller-presser removed, its holding-shank being partly broken away. Fig. 3 is a detail section on line 3 3, Fig. 1, with the locking catch or latch in the locking position it assumes when the guide is in the lifted inoperative position denoted by dotted lines in Fig. 1.

Referring to the drawings, 12 denotes the depending head portion of the bracket-arm of a sewing-machine, in which the needle-bar 13 and presser-bar 14 have their usual vertical bearings. The drawings also show the machine as provided with a trimming device similar to that of United States Patent No. 630,209 and comprising a vertically-reciprocating trimmer-bar 15, with which is suitably connected an inclined trimming knife or blade 16.

Rigidly attached to the head 12, as by a set-screw 17, is a depending stud 18, which supports a frame or bracket 19, secured to said stud by a set-screw 20. The frame or bracket 19 is recessed for the reception of a sliding-bar 21, to the lower end of which is adjustably attached a block 22, having a depending fin or lug 23, on which is pivotally mounted a bar 24, provided with a guide or gage 25, preferably recessed or formed concave, as shown, so as to afford at its lower side a small lip, which extends beneath the ply of material to be guided. A small coil-spring 26 serves to press the said guide or gage yieldingly downward, and the downward movement of the said guide or gage under the action of said spring is limited by the adjustable stop-screw 27. The slot in the lower end of the sliding bar 21, through which the screw 28 (which attaches the block 22 to said bar) passes, admits of a lateral or horizontal adjustment of said block to locate the guide 25 nearer to or farther from the needle 29. The sliding bar 21 is recessed for the reception of a lifting-spring 30, the lower end of which abuts against the screw or stud 31, fixed to the frame or bracket 19, said spring being covered by the plate 32, (partly broken away in Fig. 1,) attached to said sliding bar.

Transversely movable of the sliding bar 21 is a sliding catch or latch 33, acted on by a coil-spring 34 and adapted to engage a notch in the side of said sliding bar when the latter is in the operative position, (shown in full lines in Fig. 1;) but when the said catch or latch is disengaged from said notch by being moved laterally against the stress of the said spring 34 the sliding bar will be free to be lifted by the spring 30 to move the guide or gage 25, connected with said bar, up from the work-plate of the machine and out of the way when not desired for use, said guide being retained in such raised or inoperative position (denoted by dotted lines in Fig. 1) by said spring.

The improved guide or gage herein shown and described is especially adapted for guiding an upper piece of material having a folded or finished edge and which is to be stitched to a lower piece of material the edge of which extends beneath the said guide and the edge of which lower piece of material is to be trimmed off close to the line of stitching by the inclined undercutting trimming-knife 16. Owing to the fact that the guide 25 is yieldingly mounted by being supported by the spring-pressed pivoted bar 24, it will be understood that said guide will be free to rise or fall to accommodate different thicknesses of material passing beneath it, the downward movement of said guide under the influence of the spring 26 being controlled, as above indicated, by the adjustable stop-screw 27.

From the foregoing it will be understood that the improved guide is conveniently supported above the work-plate inside of the head of the machine, so that clear space will be afforded beneath the guide-support for the free movement of the work as the latter is turned about on the work-plate.

Having thus described my invention, I claim and desire to secure by Letters Patent—

1. A sewing-machine guiding device comprising the combination with a frame or bracket adapted for attachment to the head of the machine, so as to be supported above the work-plate thereof, of a sliding bar mounted in said frame or bracket and movable up and down, a spring for lifting said bar, a latch or catch for holding said bar in working position when depressed, a horizontally-disposed arm or bar pivotally attached to the lower end of said sliding bar and provided with a guide, and a spring acting on said arm or bar and serving to yieldingly hold the said guide downward in working position, while permitting it to yield upwardly to accommodate material of varying thickness passing beneath it.

2. In a sewing-machine, the combination, of a guide supported above the work-plate of the machine and having a recessed part to receive the edge of the material being guided, and having also a small lip extending beneath the ply of material to be guided, a sliding bar, movable up and down, with which said guide is connected, a latch or catch for holding said bar down when the guide is in working position, and a spring for lifting said bar, and thereby removing the said guide out of the way, when the said catch or latch is released.

3. In a sewing-machine, the combination, of a guide supported above the work-plate of the machine and having a recessed part to receive the edge of the material being guided, and having also a small lip extending beneath the ply of material to be guided, a sliding bar, movable up and down, with which said guide is connected, a latch or catch for holding said bar down when the guide is in working position, and a spring for yieldingly holding said guide downward while permitting it to move upwardly to accommodate material of varying thickness passing beneath it.

4. In a sewing-machine guiding device, the combination with the frame or bracket 19 adapted for attachment to the head of the machine, of the sliding bar 21 movable up and down in said frame or bracket, the spring 30 for lifting said bar, the spring-pressed sliding catch or latch 33 for retaining said bar in a lowered position, the bar 24 pivotally attached to the lower end of the said sliding bar and provided with a recessed guiding part or guide 25 supported above the work-plate of the machine, and the spring 26 for yieldingly pressing the said guiding part or guide 25 downward.

In testimony whereof I affix my signature in presence of two witnesses.

ALEX. LENNOX.

Witnesses:
HENRY J. COX,
HENRY J. MILLER.